(12) United States Patent
Inokuma et al.

(10) Patent No.: US 7,199,827 B2
(45) Date of Patent: Apr. 3, 2007

(54) AMPLIFIED SOLID-STATE IMAGE PICKUP DEVICE AND IMAGE PICKUP SYSTEM USING THE SAME

(75) Inventors: Kazuyuki Inokuma, Kyoto (JP); Toshiya Fujii, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 760 days.

(21) Appl. No.: 10/670,204

(22) Filed: Sep. 26, 2003

(65) Prior Publication Data

US 2004/0085467 A1 May 6, 2004

(30) Foreign Application Priority Data

Oct. 31, 2002 (JP) ............... 2002-318720

(51) Int. Cl.
*H04N 5/335* (2006.01)
*H04N 3/14* (2006.01)

(52) U.S. Cl. .................. 348/300; 348/301; 348/307; 348/308

(58) Field of Classification Search ............. 348/300, 348/301, 302, 308, 241, 243; 250/208.1
See application file for complete search history.

(56) References Cited

U.S. PATENT DOCUMENTS

| | | | | |
|---|---|---|---|---|
| 5,268,764 | A * | 12/1993 | Kihara et al. ........... | 348/245 |
| 5,355,165 | A | 10/1994 | Kosonocky et al. | |
| 5,790,191 | A * | 8/1998 | Zhang .................... | 348/300 |
| 6,118,115 | A * | 9/2000 | Kozuka et al. .......... | 250/208.1 |
| 6,546,150 | B2 * | 4/2003 | Inui ....................... | 382/278 |
| 6,650,369 | B2 * | 11/2003 | Koizumi et al. ........ | 348/301 |
| 6,747,699 | B2 * | 6/2004 | Ohzu et al. ............. | 348/294 |
| 6,777,660 | B1 * | 8/2004 | Lee ........................ | 250/208.1 |
| 6,784,928 | B1 * | 8/2004 | Sakurai et al. .......... | 348/220.1 |
| 6,801,255 | B2 * | 10/2004 | Inui ....................... | 348/241 |
| 7,113,212 | B2 * | 9/2006 | Yonemoto et al. ...... | 348/302 |
| 2002/0067416 | A1 * | 6/2002 | Yoneda et al. .......... | 348/304 |
| 2002/0167601 | A1 * | 11/2002 | Ohzu et al. ............. | 348/243 |
| 2003/0052982 | A1 * | 3/2003 | Chieh .................... | 348/302 |

FOREIGN PATENT DOCUMENTS

JP        4-277986        10/1992

* cited by examiner

*Primary Examiner*—David Ometz
*Assistant Examiner*—Pritham D. Prabhakher
(74) *Attorney, Agent, or Firm*—McDermott Will & Emery LLP

(57) ABSTRACT

An image pickup area including a plurality of pixels arranged in a two-dimensional matrix pattern, each pixel being an amplified MOS image sensor, is divided into a block A including odd-numbered columns of pixels and a block B including even-numbered columns of pixels. A horizontal signal line and an output amplifier are provided for each of the block A and the block B. Signal voltages on vertical signal lines are temporarily stored in a line memory. In the normal mode, the signal voltages of two pixels adjacent to each other in the horizontal direction are supplied from the line memory respectively to the output amplifiers. In the correction mode, a switch is closed to connect the horizontal signal lines with each other so that the signal voltage of the same pixel is supplied to the output amplifiers.

8 Claims, 7 Drawing Sheets

US 7,199,827 B2

AMPLIFIED SOLID-STATE IMAGE PICKUP DEVICE AND IMAGE PICKUP SYSTEM USING THE SAME

BACKGROUND OF THE INVENTION

The present invention relates to an amplified solid-state image pickup device and an image pickup system using the same.

A solid-state image pickup device including a plurality of pixels, each being an amplified MOS image sensor called "AMI (amplified MOS imager)", has been known in the art. Each pixel includes a photodiode for converting incident light into an electric charge, and a source follower transistor for supplying a signal voltage according to the amount of charge generated by the conversion.

A conventional technique achieves a high frame rate by dividing the image pickup area of MOS image sensors into a plurality of blocks, and repeatedly scanning only pixels in at least one block being selected (see Japanese Laid-Open Patent Publication No. 4-277986).

For image pickup systems such as digital still cameras and digital video cameras, there is an increasing demand for rapidly shooting a series of frames with a high resolution and for taking a motion picture with a high resolution.

One way to rapidly take an high-resolution image with an image pickup system using an amplified solid-state image pickup device is to divide the image pickup area into a plurality of blocks while providing an output amplifier for each of these blocks. However, with such an amplified solid-state image pickup device of a parallel output type, characteristic variations inevitably occur among the output amplifiers. Therefore, it is necessary to correct the gray level variations among the amplifier outputs, and this level correction needs to be a non-linear correction.

SUMMARY OF THE INVENTION

It is an object of the present invention to provide an amplified solid-state image pickup device of a parallel output type capable of providing amplifier outputs that are suitable for level correction, and an image pickup system using the same.

In order to achieve the object, the present invention provides an amplified solid-state image pickup device of a parallel output type, in which signal voltages of different ones of a plurality of pixels are supplied to a plurality of output amplifiers in the normal mode, while a signal voltage of the same pixel is supplied to a plurality of output amplifiers in the correction mode. Thus, in the normal mode, high-speed shooting can be realized, and in the correction mode, the same signal voltage from the same pixel can be output from different output amplifiers, whereby the output levels of the amplifiers can be corrected.

DETAILED DESCRIPTION OF THE INVENTION

An embodiment of the present invention will now be described with reference to the drawings.

Figure 1:
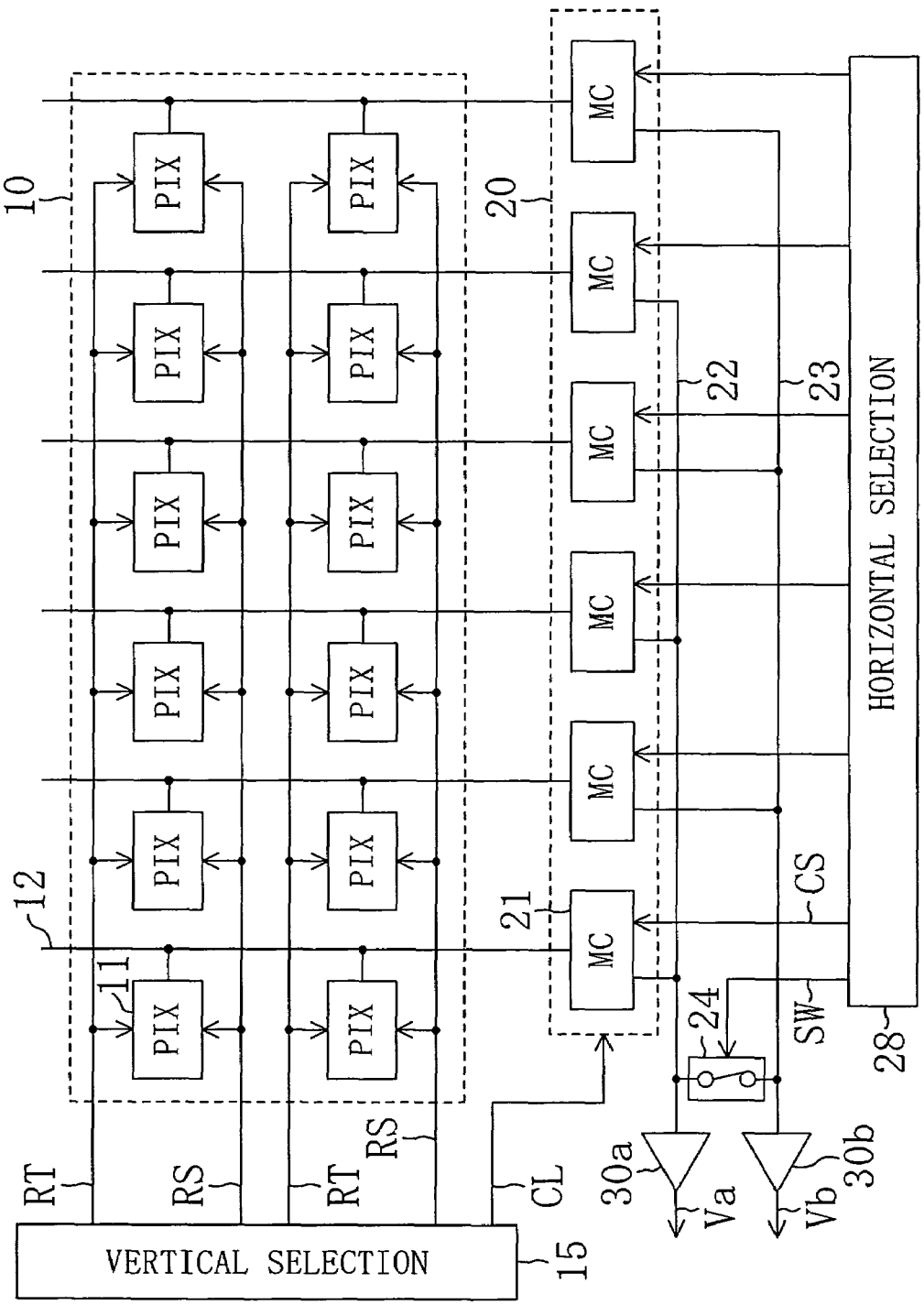
FIG. 1 is a block diagram illustrating the configuration of an amplified solid-state image pickup device of the present invention.

FIG. 1 illustrates the configuration of an amplified solid-state image pickup device 1 of the present invention. The amplified solid-state image pickup device 1 of FIG. 1 includes an image pickup area 10, in which a plurality of pixels (PIX) 11 are arranged in a two-dimensional matrix pattern. Each pixel 11 is an amplified MOS image sensor called "AMI (amplified MOS imager)". For the purpose of illustration, it is assumed herein that the number of pixels 11 is 2×6.

The amplified solid-state image pickup device 1 further includes six vertical signal lines 12, a vertical selection circuit 15, a line memory 20 including six memory cells (MC) 21, a first horizontal signal line 22, a second horizontal signal line 23, a switch 24, a horizontal selection circuit 28, a first output amplifier 30a, and a second output amplifier 30b. The vertical selection circuit 15 is a circuit for selecting six of the twelve pixels 11 that belong to one horizontal line so that the signal voltages of the six pixels 11 belonging to the horizontal line are supplied respectively to the six vertical signal lines 12. "RT" denotes a reset signal, and "RS" denotes a row selection signal. Each of the six vertical signal lines 12 is a signal line for transferring the signal voltage of the pixel 11 belonging to the corresponding column to the line memory 20. Each of the six memory cells 21 of the line memory 20 is a memory cell for temporarily storing the signal voltage being supplied onto the corresponding one of the six vertical signal lines 12. "CL" denotes a clamp pulse. The first horizontal signal line 22 is a signal line for transferring the signal voltage to be supplied to the first output amplifier 30a, and is connected to odd-numbered (counting from the left) memory cells 21 in the line memory 20. The second horizontal signal line 23 is a signal line for transferring the signal voltage to be supplied to the second output amplifier 30b, and is connected to even-numbered memory cells 21 in the line memory 20. Thus, a pair of memory cells 21 that receive signal voltages from adjacent ones of the six vertical signal lines 12 are connected to different horizontal signal lines 22 and 23. The horizontal selection circuit 28 is a circuit for selecting signal voltages to be supplied to the first and second horizontal signal lines 22 and 23 from among all the signal voltages being temporarily stored in the line memory 20. The switch 24 connects the first and second horizontal signal lines 22 and 23 with each other in the correction mode. "CS" denotes a column selection signal, "SW" a switch control signal, "Va" the output voltage of the first output amplifier 30a, and "Vb" the output voltage of the second output amplifier 30b.

Thus, the image pickup area 10 illustrated in FIG. 1 is divided into two blocks, i.e., the first block (hereinafter referred to as the "block A") including the odd-numbered three columns, and the second block (hereinafter referred to as the "block B") including the even-numbered three columns. The first horizontal signal line 22 and the first output amplifier 30a are for the block A, and the second horizontal signal line 23 and the second output amplifier 30b are for the block B.

Figure 2:
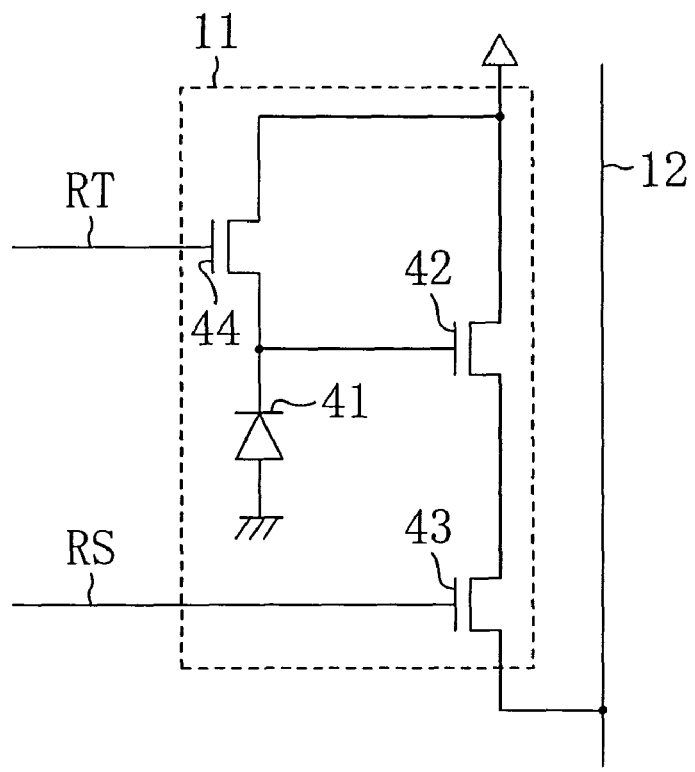
FIG. 2 is a circuit diagram illustrating a detailed configuration of one of the pixels illustrated in FIG. 1.

FIG. 2 illustrates a detailed configuration of one of the pixels 11 illustrated in FIG. 1. In FIG. 2, reference numeral 41 denotes a photodiode, 42 a source follower transistor, 43 a selection transistor, and 44 a reset transistor. The photodiode 41 is a photoelectric conversion element for converting incident light into an electric charge. The source follower transistor 42 is an amplifier for supplying a signal voltage according to the amount of charge generated by the photoelectric conversion to the vertical signal line 12. The selection transistor 43 and the reset transistor 44 receive the row selection signal RS and the reset signal RT, respectively, from the vertical selection circuit 15.

Figure 3:
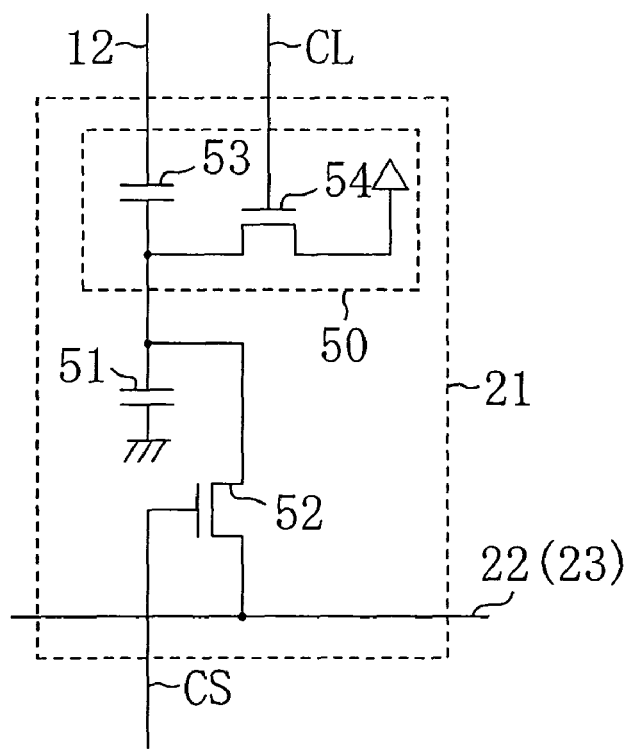
FIG. 3 is a circuit diagram illustrating a detailed configuration of one of the memory cells illustrated in FIG. 1.

FIG. 3 illustrates a detailed configuration of one of the memory cells 21 illustrated in FIG. 1. In FIG. 3, reference numeral 50 denotes a noise reduction section, 51 a memory capacitor, and 52 a selection transistor. The noise reduction section 50 includes a capacitor 53 and a clamp transistor 54. The memory capacitor 51 is connected to the vertical signal line 12 via the capacitor 53. The selection transistor 52 receives the column selection signal CS from the horizontal selection circuit 28, and the clamp transistor 54 receives the clamp pulse CL from the vertical selection circuit 15. The noise reduction section 50 selects and outputs the signal voltage (black level) immediately after asserting the reset signal RT in the pixel 11, while turning ON the clamp transistor 54 to clamp the black level at the power supply voltage. Thus, it is possible to suppress black level fluctuation due to variations among the source follower transistors 42 of the pixels 11. Note that as the charge is accumulated in the photodiode 41 of the pixel 11, the gate voltage of the source follower transistor 42 decreases.

With the configuration of FIG. 1, six pixels 11 belonging to one horizontal line are selected simultaneously by the vertical selection circuit 15, whereby the signal voltages of these pixels 11 are supplied respectively onto the six vertical signal lines 12. The line memory 20 temporarily stores the signal voltages on the six vertical signal lines 12. The exposure time is an amount of time from when the photodiode 41 is reset until when the pixel 11 is selected by the vertical selection circuit 15, thereby storing the signal voltage in the line memory 20. Thus, the exposure time is the same among all the pixels 11 belonging to the same line.

In the normal mode, the switch 24 is opened, and the signal voltages of the pixels 11, which have been temporarily stored in the line memory 20, are successively selected by the horizontal selection circuit 28. In this operation, the first and second the memory cells 21 from the left in the line memory 20, for example, are selected simultaneously, whereby the signal voltages of two pixels 11 adjacent to each other in the horizontal direction are supplied to the first and second output amplifiers 30a and 30b, respectively, and the output voltages Va and Vb are obtained in parallel from the output amplifiers 30a and 30b, respectively. On the other hand, in the correction mode, the switch 24 is closed, and the signal voltage of the same pixel is supplied to the first and second output amplifiers 30a and 30b. In this operation, the output voltages Va and Vb represent the characteristic variations between the output amplifiers 30a and 30b. Note that any of the twelve pixels 11 in the image pickup area 10 can supply a correction signal voltage.

Figure 4:
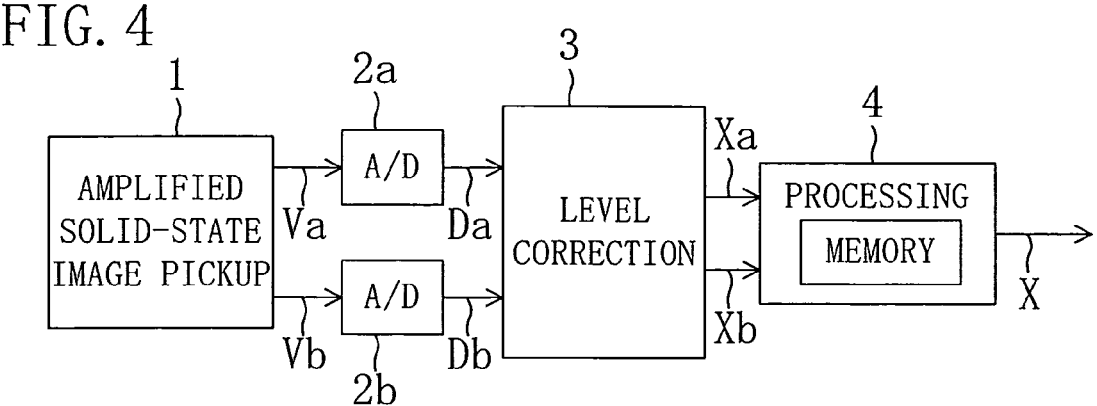
FIG. 4 is a block diagram illustrating a configuration of an image pickup system using the amplified solid-state image pickup device of FIG. 1.

FIG. 4 illustrates the configuration of an image pickup system using the amplified solid-state image pickup device 1 of FIG. 1. In FIG. 4, reference numeral 2a denotes a first A/D converter, 2b a second A/D converter, 3 a level correction circuit, and 4 a processing circuit. The first A/D converter 2a converts the output voltage Va of the first output amplifier 30a into first gray level data (digital value) Da. The second A/D converter 2b converts the output voltage Vb of the second output amplifier 30b into second gray level data (digital value) Db. The level correction circuit 3 is a circuit for correcting the gray level variations between the output voltages Va and Vb by using the gray level data Da and Db in the correction mode. The processing circuit 4 is a circuit for producing image data X representing the luminance signal and the chrominance signal by using the corrected gray level data Xa and Xb, and includes therein a memory for the processing operation. Since the outputs of two pixels 11 adjacent to each other in the horizontal direction are obtained simultaneously from the amplified solid-state image pickup device 1 in the normal mode, the configuration of the processing circuit 4, which performs an arithmetic mean operation, etc., on the outputs of these two pixels 11, is simplified.

Figure 5:
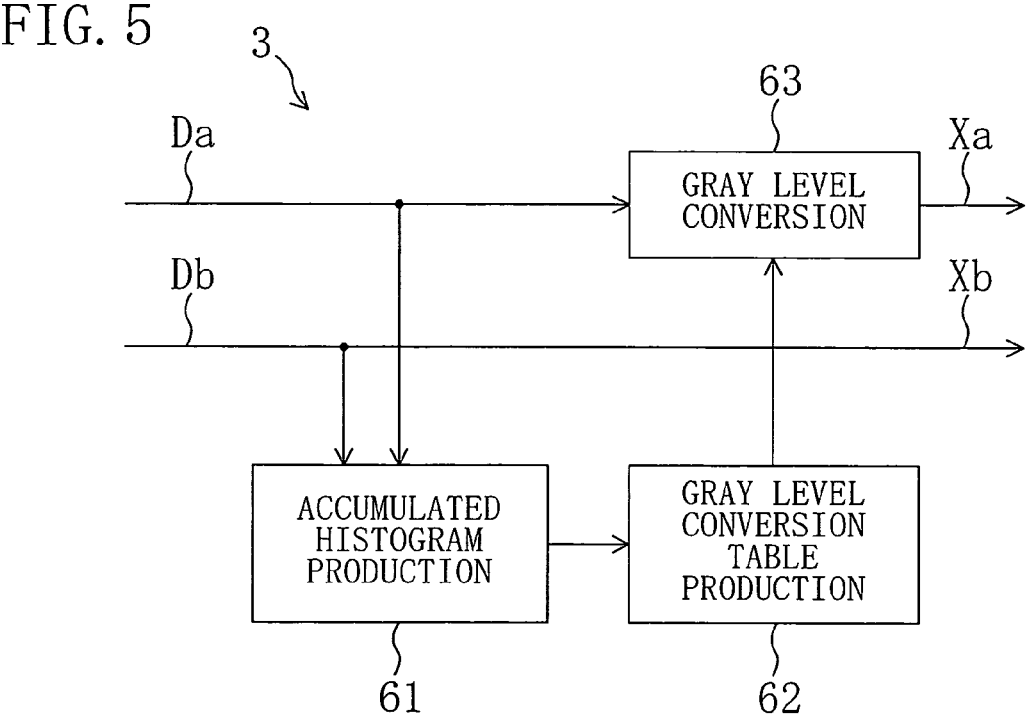
FIG. 5 is a block diagram illustrating a detailed configuration of a level correction circuit illustrated in FIG. 4.

FIG. 5 illustrates a detailed configuration of the level correction circuit 3 illustrated in FIG. 4. In FIG. 5, 61 denotes an accumulated histogram production section, 62 a gray level conversion table production section, and 63 a gray level conversion section. The accumulated histogram production section 61 produces, for each block of the image pickup area 10, an accumulated histogram for the number of pixels for each gray level, by using the first and second gray level data Da and Db in the correction mode. The gray level conversion table production section 62 produces a table representing the correspondence between un-corrected and corrected gray levels for the block to be corrected so as to reduce the difference between accumulated histograms for different blocks produced by the accumulated histogram production section 61. In the following description, it is assumed that the block A, from which the first gray level data Da is obtained, is the block to be corrected. The gray level conversion section 63 non-linearly corrects, for each gray level, the gray level data Da from the block to be corrected in the normal mode, by using the table produced by the gray level conversion table production section 62. "Xa" denotes corrected gray level data.

Figure 6:
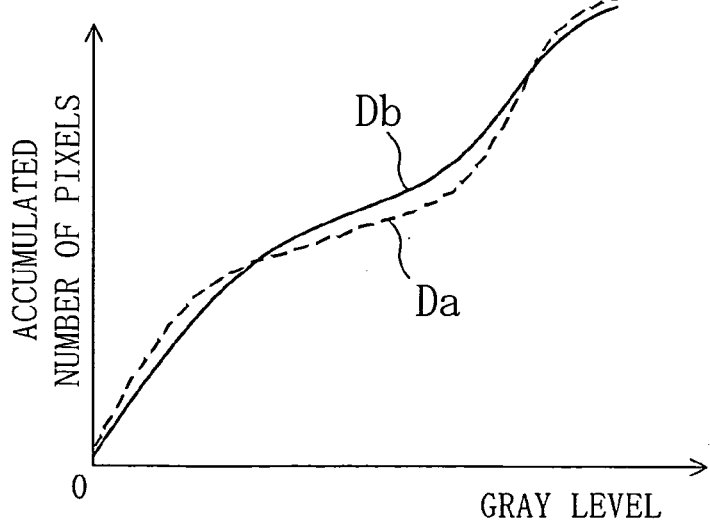
FIG. 6 is an example of an accumulated histogram produced in the level correction circuit of FIG. 5.

FIG. 6 is an example of an accumulated histogram produced in the level correction circuit 3 of FIG. 5. The accumulated histogram is obtained by accumulating the numbers of pixels for different gray levels, starting from the lower-luminance side, and is characterized by its monotonous increase. The gray scale includes 256 gray levels, for example. The accumulated histogram curves of the blocks A and B in FIG. 6 show a slight difference therebetween due to the characteristic variations between the output amplifiers 30a and 30b. Accordingly, a gray level conversion table is produced that represents the correspondence between un-corrected and corrected gray levels for the block A to be corrected so that the curve of the block A is matched with the curve of the reference block B. A non-linear correction operation is achieved by using the table.

Figure 7:
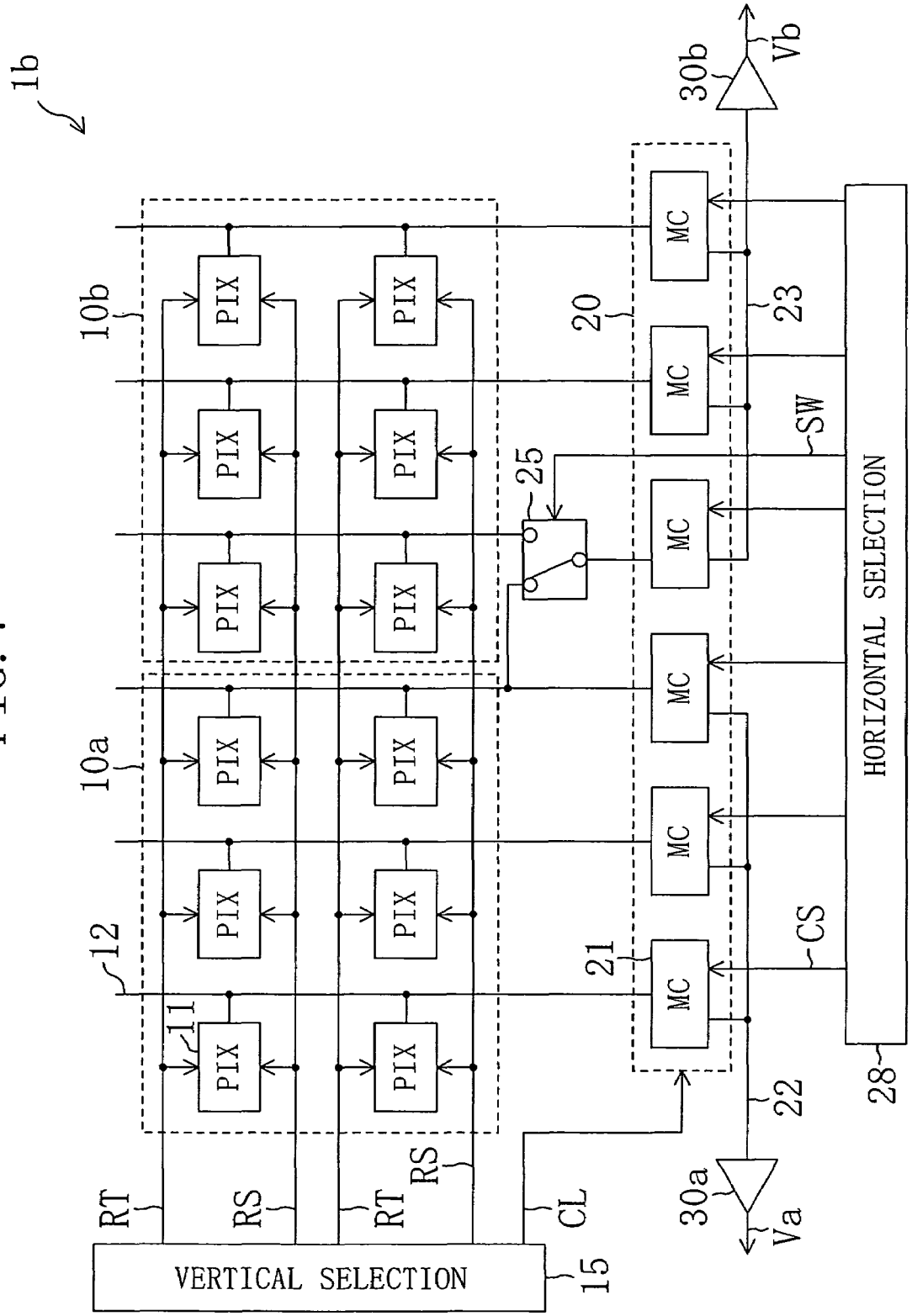
FIG. 7 is a block diagram illustrating the configuration of another amplified solid-state image pickup device of the present invention.

FIG. 7 illustrates the configuration of another amplified solid-state image pickup device 1a of the present invention. The image pickup area of the amplified solid-state image pickup device 1a of FIG. 7 is divided into a left-side area (block A) 10a and a right-side area (block B) 10b. The first horizontal signal line 22 is connected to three memory cells 21 for temporarily storing the signal voltages on three adjacent vertical signal lines 12 in the block A. The second horizontal signal line 23 is connected to three memory cells 21 for temporarily storing the signal voltages on three adjacent vertical signal lines 12 in the block B. Thus, the memory cells 21 that are commonly connected to one of the first and second horizontal signal lines 22 and 23 receive signal voltages from the vertical signal lines 12 that are adjacent to one another. Moreover, a switch 25 is provided between the image pickup areas 10a and 10b and the line memory 20. In the normal mode, the signal voltage on the leftmost one of the three vertical signal lines 12 for the block B is guided by the switch 25 to the corresponding one (the leftmost one) of the three memory cells 21 for the block B, and in the correction mode, the signal on the rightmost one of the three vertical signal lines 12 for the block A is guided by the switch 25 to the leftmost one of the three memory cells 21 for the block B. Thus, in the correction mode, the signal voltage of the same pixel in the block A is temporarily stored in two different memory cells 21 simultaneously.

With the configuration of FIG. 7, in the normal mode, the switch 25 is turned to the block B, and the signal voltages of the pixels 11, being temporarily stored in the line memory 20, are successively selected by the horizontal selection circuit 28. In this operation, the first and fourth memory cells 21 from the left in the line memory 20, for example, are selected simultaneously, whereby the signal voltages of two pixels 11 remote from each other in the horizontal direction are supplied to the first and second output amplifiers 30a and 30b, respectively, and the output voltages Va and Vb are obtained in parallel from the output amplifiers 30a and 30b, respectively. On the other hand, in the correction mode, the switch 25 is turned to the block A, and the signal voltage of the same pixel belonging to the rightmost column of the block A is supplied to the first and second output amplifiers 30a and 30b. In this operation, the output voltages Va and Vb represent the characteristic variations between the output amplifiers 30a and 30b.

Figure 8:
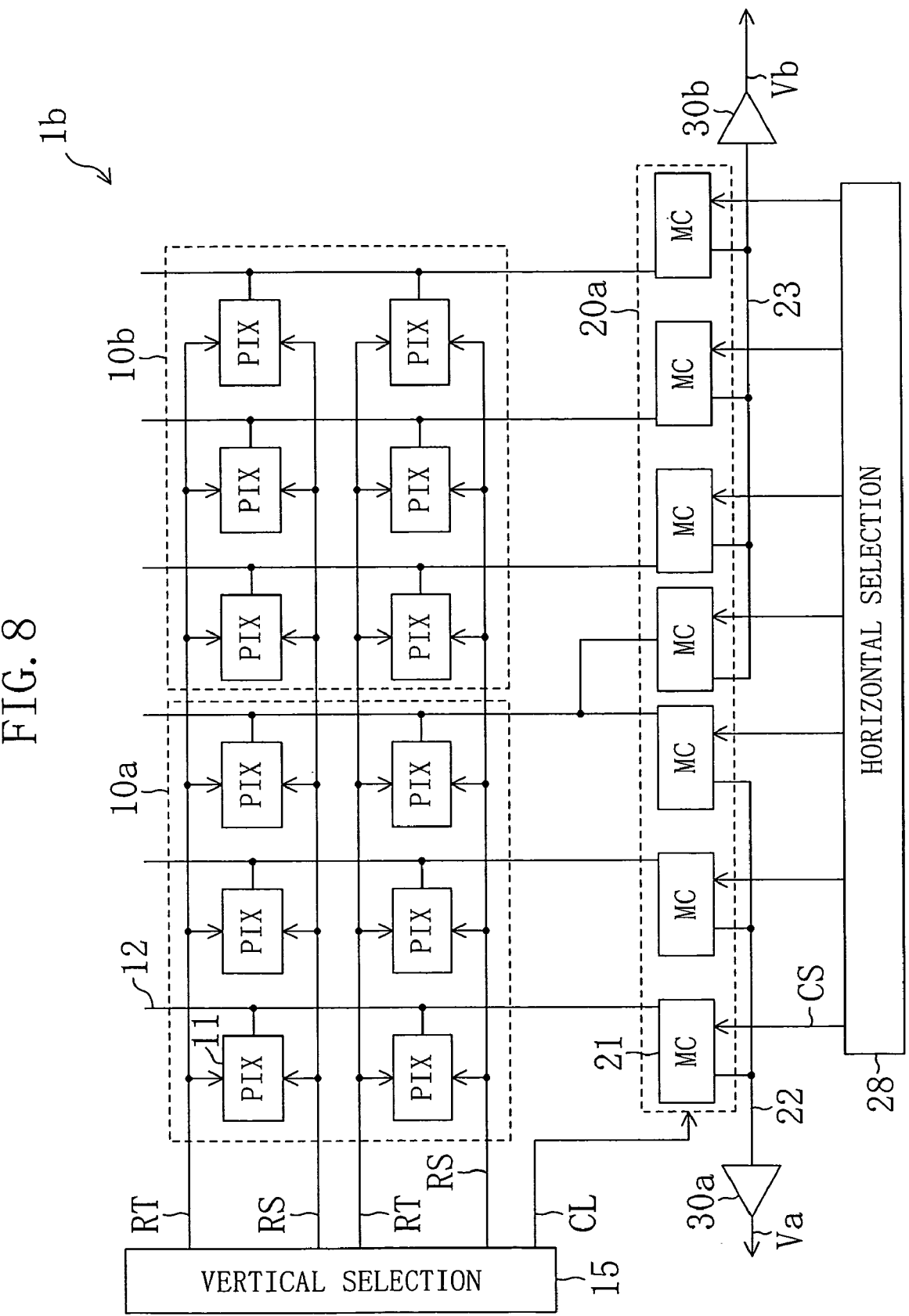
FIG. 8 is a block diagram illustrating the configuration of still another amplified solid-state image pickup device of the present invention.

FIG. 8 illustrates the configuration of still another amplified solid-state image pickup device 1b of the present invention. The image pickup area is divided into blocks as in FIG. 7. In the amplified solid-state image pickup device 1b of FIG. 8, a line memory 20a includes seven memory cells 21. One of the seven memory cells 21 is an additional cell for temporarily storing the signal voltage on the rightmost one of the three vertical signal lines 12 for the block A at the same time as the other six memory cells 21 store signal voltages, and for supplying the temporarily stored signal voltage to the second horizontal signal line 23 for the block B.

With the configuration of FIG. 8, in the normal mode, six memory cells 21 in the line memory 20a are successively selected by the horizontal selection circuit 28 two by two. On the other hand, in the correction mode, the rightmost one of the three memory cells 21 for the block A and the additional cell are selected simultaneously, and the signal voltage of the same pixel belonging to the rightmost column of the block A is supplied to the first and second output amplifiers 30a and 30b. In this operation, the output voltages Va and Vb represent the characteristic variations between the output amplifiers 30a and 30b. Alternatively, in the correction mode, the voltage Vb based on the signal voltage temporarily stored in the additional cell may be output after successively outputting the voltages Va and Vb in the same sequence as that in the normal mode. Thus, aging of the amplifier characteristics due to temperature changes, etc., can be addressed at any time.

Figure 9:
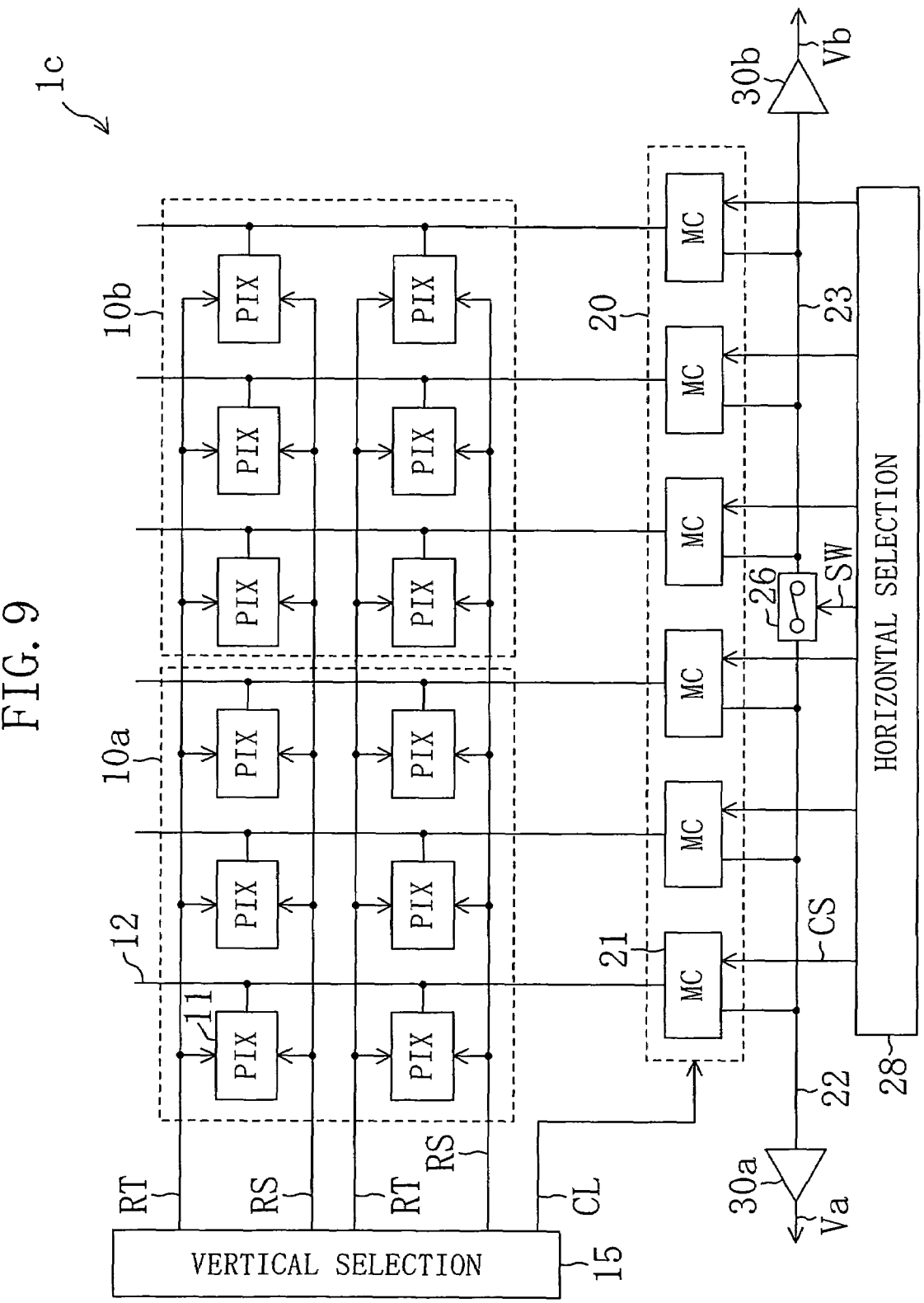
FIG. 9 is a block diagram illustrating the configuration of yet another amplified solid-state image pickup device of the present invention.

FIG. 9 illustrates the configuration of yet another amplified solid-state image pickup device 1c of the present invention. The image pickup area is divided into blocks as in FIG. 7 and FIG. 8. The amplified solid-state image pickup device 1c of FIG. 9 includes a switch 26 for connecting the first and second horizontal signal lines 22 and 23 with each other in the correction mode.

In the normal mode, the switch 26 is opened, and the six memory cells 21 in the line memory 20 are successively selected by the horizontal selection circuit 28 two by two. On the other hand, in the correction mode, the switch 26 is closed, and the signal voltage of the same pixel is supplied to the first and second output amplifiers 30a and 30b. In this operation, the output voltages Va and Vb represent the characteristic variations between the output amplifiers 30a and 30b. Note that any of the twelve pixels 11 in the image pickup areas 10a and 10b can supply a correction signal voltage.

Figure 10:
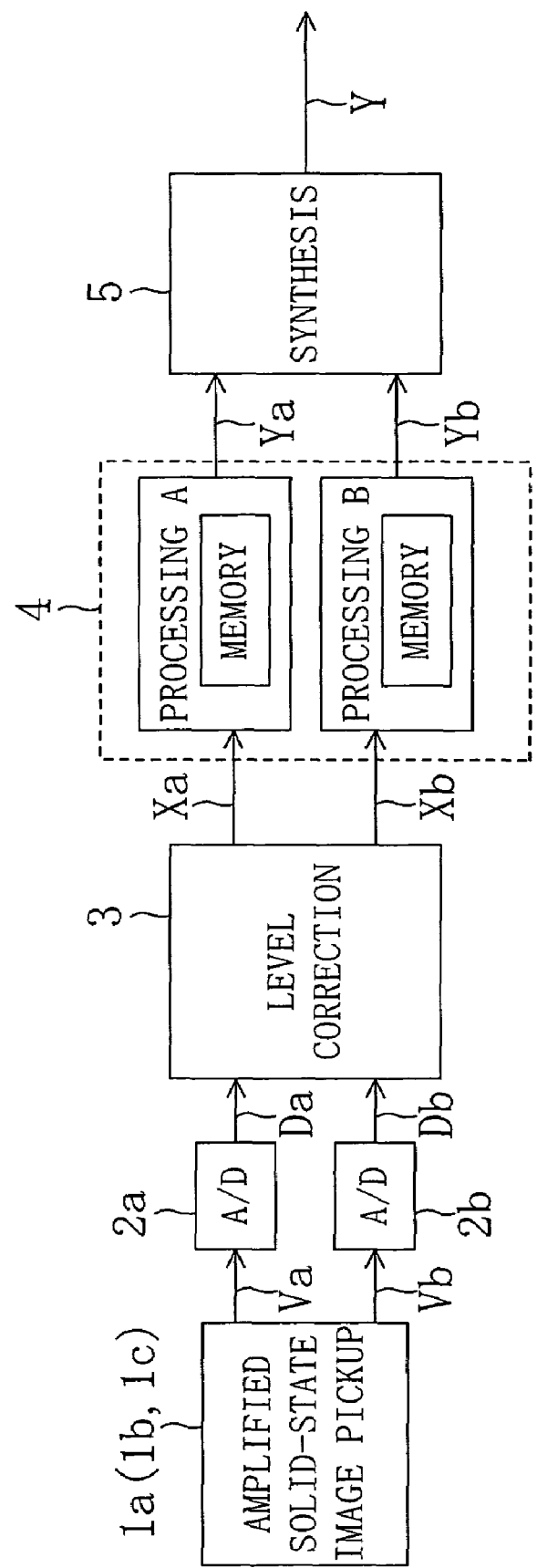
FIG. 10 is a block diagram illustrating the configuration of an image pickup system using one of the amplified solid-state image pickup devices of FIG. 7 to FIG. 9.

FIG. 10 illustrates the configuration of an image pickup system using one of the amplified solid-state image pickup devices 1a, 1b and 1c of FIG. 7 to FIG. 9. The processing circuit 4 in FIG. 10 is a circuit for producing image data Ya and image data Yb for different blocks, each representing the luminance signal and the chrominance signal, by using the corrected gray level data Xa and Xb, respectively, and includes therein a memory for the processing operation for each block. A synthesis circuit 5 is a circuit for synthesizing the image data Ya and Yb for different blocks into data Y representing one image. Other than this, the configuration is the same as that illustrated in FIG. 4.

Note that for the amplified solid-state image pickup devices 1, 1a, 1b and 1c, the image pickup areas 10, 10a and 10b may be divided into three or more blocks.

What is claimed is:

1. An amplified solid-state image pickup device, comprising:
    a plurality of pixels each including a photoelectric conversion element for converting incident light into an electric charge, and an amplifier for supplying a signal voltage according to an amount of charge generated by the conversion, wherein the plurality of pixels form an image pickup area, which is divided into a plurality of blocks;
    a plurality of output amplifiers provided respectively for the plurality of blocks; and
    signal voltage supply means for supplying signal voltages of different ones of the plurality of pixels respectively to the plurality of output amplifiers in a normal mode, while supplying a signal voltage of the same one of the plurality of pixels to the plurality of output amplifiers in a correction mode.

2. The amplified solid-state image pickup device of claim 1, wherein the plurality of pixels are each an amplified MOS image sensor.

3. The amplified solid-state image pickup device of claim 1, wherein:
    the plurality of pixels are arranged in a two-dimensional matrix pattern; and
    the signal voltage supply means includes:
        a plurality of vertical signal lines each for transferring signal voltages of one or more of the plurality of pixels belonging to a corresponding column;
        a vertical selection circuit for selecting ones of the plurality of pixels belonging to one horizontal line so that signal voltages of the pixels belonging to the horizontal line are supplied respectively onto the plurality of vertical signal lines;

a line memory including a plurality of memory cells each for temporarily storing a signal voltage being supplied onto a corresponding one of the plurality of vertical signal lines;

a plurality of horizontal signal lines each for transferring a signal voltage to be supplied to a corresponding one of the plurality of output amplifiers; and a horizontal selection circuit for selecting some of the signal voltages being temporarily stored in the line memory to be supplied to the plurality of horizontal signal lines.

4. The amplified solid-state image pickup device of claim 3, wherein:

memory cells that receive signal voltages from adjacent ones of the plurality of vertical signal lines are connected to different ones of the horizontal signal lines; and the signal voltage supply means further includes a switch for connecting the plurality of horizontal signal lines with one another in the correction mode.

5. The amplified solid-state image pickup device of claim 3, wherein:

memory cells that are commonly connected to one of the plurality of horizontal signal lines receive signal voltages respectively from adjacent ones of the plurality of vertical signal lines; and the signal voltage supply means further includes a switch, by which a signal voltage on a predetermined one of the plurality of vertical signal lines for one of the plurality of blocks is guided to another predetermined one of the plurality of vertical signal lines for another one of the plurality of blocks in the correction mode.

6. The amplified solid-state image pickup device of claim 3, wherein:

memory cells that are commonly connected to one of the plurality of horizontal signal lines receive signal voltages respectively from adjacent ones of the plurality of vertical signal lines; and the line memory further includes an additional cell for temporarily storing a signal voltage on a predetermined one of the plurality of vertical signal lines for one of the plurality of blocks, and for supplying the temporarily stored signal voltage to a predetermined one of the plurality of horizontal signal lines for another one of the plurality of blocks.

7. The amplified solid-state image pickup device of claim 3, wherein memory cells that are commonly connected to one of the plurality of horizontal signal lines receive signal voltages respectively from adjacent ones of the plurality of vertical signal lines; and the signal voltage supply means further includes a switch for connecting the plurality of horizontal signal lines with one another in the correction mode.

8. An image pickup system, comprising the amplified solid-state image pickup device of any one of claims 1 to 7, and a level correction circuit for correcting gray level variations among outputs of the plurality of output amplifiers, wherein the level correction circuit includes:

an accumulated histogram production section for producing, for each block, an accumulated histogram for the number of pixels for each gray level, by using gray level data based on outputs of the plurality of output amplifiers in the correction mode;

a gray level conversion table production section for producing a table representing correspondence between un-corrected and corrected gray levels for one of the plurality of blocks to be corrected so as to reduce a difference between accumulated histograms for different blocks produced by the accumulated histogram production section; and a gray level conversion section for non-linearly correcting, for each gray level, an output of one of the plurality of output amplifiers for the block to be corrected by using the produced table.

* * * * *